United States Patent
Mierzejewski et al.

(10) Patent No.: US 9,567,249 B2
(45) Date of Patent: Feb. 14, 2017

(54) INTEGRATED SELENIUM REMOVAL SYSTEM FOR WASTE WATER

(75) Inventors: Marek Mierzejewski, Richmond, VA (US); Michael W. Wismer, Lino Lakes, MN (US); Karthikeyan Sathrugnan, Singapore (SG)

(73) Assignee: Evoqua Water Technologies Pte. Ltd., Singapore (SG)

( * ) Notice: Subject to any disclaimer, the term of this patent is extended or adjusted under 35 U.S.C. 154(b) by 605 days.

(21) Appl. No.: 13/825,725

(22) PCT Filed: Sep. 23, 2011

(86) PCT No.: PCT/US2011/052858
§ 371 (c)(1),
(2), (4) Date: Sep. 4, 2013

(87) PCT Pub. No.: WO2012/040525
PCT Pub. Date: Mar. 29, 2012

(65) Prior Publication Data
US 2013/0334134 A1    Dec. 19, 2013

Related U.S. Application Data

(60) Provisional application No. 61/386,427, filed on Sep. 24, 2010.

(51) Int. Cl.
*B01D 61/02*  (2006.01)
*C02F 1/70*   (2006.01)
(Continued)

(52) U.S. Cl.
CPC ............ *C02F 9/00* (2013.01); *C02F 1/441* (2013.01); *C02F 1/442* (2013.01); *C02F 1/705* (2013.01);
(Continued)

(58) Field of Classification Search
CPC ......... C02F 9/00; C02F 1/441; C02F 2101/20; C02F 1/52; C02F 5/08; C02F 1/42; C02F 1/1442; C02F 3/28; C02F 3/2806; C02F 3/345; C02F 2101/106; B01D 2311/04; B01D 2311/06; B01D 2311/25; B01D 2311/2649; B01D 61/04; B01D 61/58; B01D 61/027
(Continued)

(56) References Cited

U.S. PATENT DOCUMENTS

| | | | |
|---|---|---|---|
| 4,405,464 A | 9/1983 | Baldwin et al. | |
| 4,519,913 A | 5/1985 | Baldwin et al. | |
| 4,725,357 A * | 2/1988 | Downing ............... | C01B 19/00 210/603 |
| 4,806,264 A | 2/1989 | Murphy | |
| 5,271,831 A | 12/1993 | Oremland | |
| 5,427,691 A * | 6/1995 | Kuyucak ............... | C01F 11/46 210/713 |
| 5,993,667 A | 11/1999 | Overman | |
| 6,113,797 A * | 9/2000 | Al-Samadi .......... | B01D 61/022 210/650 |
| 2007/0187329 A1 | 8/2007 | Moller et al. | |
| 2008/0257820 A1 | 10/2008 | Peeters et al. | |

(Continued)

*Primary Examiner* — Nam Nguyen
*Assistant Examiner* — Claire Norris

(57) ABSTRACT

The inventive process scheme and its various embodiments described herein will comprise filtering a selenium containing water by reverse osmosis or nanofiltration to produce a primary permeate stream at least meeting the water stream effluent discharge requirements of the location and a concentrate stream containing the removed selenium and other species, a RO or NF concentrate treatment specific to the case which will treat and reduce the selenium content of the concentrate, optionally in conjunction with a sulfate removal process, and result in a highly concentrated sludge or other output, and a selenium depleted aqueous overflow stream, a portion of which will be combined with the primary permeate stream so that the selenium content of the combined (Continued)

stream does not exceed the local requirement, and the reminder of the selenium depleted aqueous overflow stream will be returned to be combined with the selenium containing water entering the inlet of the primary reverse osmosis treatment.

19 Claims, 6 Drawing Sheets

(51) Int. Cl.
    *C02F 9/00*     (2006.01)
    *C02F 1/44*     (2006.01)
    *C02F 3/30*     (2006.01)
    *C02F 101/10*     (2006.01)

(52) U.S. Cl.
    CPC ........... *C02F 3/30* (2013.01); *C02F 2101/101* (2013.01); *C02F 2101/106* (2013.01)

(58) Field of Classification Search
    USPC ....... 210/650, 652, 702, 638, 651, 660, 709, 210/712
    See application file for complete search history.

(56) References Cited

U.S. PATENT DOCUMENTS

| | | |
|---|---|---|
| 2010/0193436 A1 | 8/2010 | Ruehr et al. |
| 2011/0132839 A1 | 6/2011 | Zuback et al. |
| 2011/0163032 A1 | 7/2011 | Alexander et al. |

* cited by examiner

Figure 3: Selenium Content in Feed, Reject(Concentrate) and Permeate for RO

Effect of ZVI filing dosage on Selenate reduction

Tests with Steel Wool for PP Sample and FGD Waste

INTEGRATED SELENIUM REMOVAL SYSTEM FOR WASTE WATER

FIELD

Selenium is removed from selenium contaminated water by an integrated system comprising reverse osmosis and retentate treatment and recycle.

BACKGROUND

While selenium is an essential element for animals, toxicity may occur with as little as 5 mg/kg. Exposure to toxic levels manifests in birds and fish as embryo mortality and deformities, and poor post hatching survival. Selenium in the environment of these species may result from mining operations, for example, discharge from tailings impoundments, run-off from waste rock piles, discharge from fly ash ponds at fossil fuel combustion plants, or from impoundments or run-off from large scale agricultural irrigation.

Regulatory guidelines for the concentration level in North America for selenium discharge requirements are presently low and can be expected to trend lower. The USEPA has set the Maximum Contaminant Level (MCL) and the Maximum Contaminant Level Goal (MCLG) in drinking water for selenium at 0.05 mg/L. EPA has found selenium to potentially cause the following health effects when people are exposed to it at levels above the MCL for relatively short periods of time; hair and fingernail changes; damage to the peripheral nervous system; fatigue and irritability.

To meet future requirements, industrial and other discharging entities should plan on requirements of the order of 1-5 µg/L (ppb). Selenium discharges at this level are challenging because selenium exists in a variety of different forms, is usually at a dilute concentration, and treatment results in a concentrated residual which has to be disposed of without re-release of selenium.

The need for selenium removal or reduction technology has generated many approaches to this problem. These can be separated into four categories, each with their strengths and weaknesses. Practitioners desiring to select a technology will find that they face two daunting problems; the difference in effectiveness exhibited by the technologies on different selenium ion forms, selenate (Se+6 or SeVI) and selenite (Se+4 or SeIV), and other organocomplexes, such as selenocyanate, and the deleterious effect of other ions, particularly sulfate ions on the various technologies.

1. Standard Desalting Techniques

The use of reverse osmosis (RO) and nanofiltration (NF) to remove selenium from water has been reported. Nanofiltration can remove selenate, but is less effective against selenite. Reverse osmosis is reported able to remove selenate and selenite to less than about 5 µg/L at full scale.

Ion exchange (IX) can remove selenate but is less effective for selenite. Sulfate which has almost equivalent ion exchange affinity decreases the effectiveness of IX for selenate. It has been reported that arsenic removal media, such as DOW Adsorbsia™ removes selenite, but not selenate.

2. Adsorption Techniques

Ferrihydrite (ferric oxyhydroxide mineral) precipitation, which may be used as a co-precipitate with ferric salts, effectively removes selenite, Se(IV) at pH<~8, but is not effective for selenate, Se(VI). Reduction of Se(VI) prior to adsorption is required. The presence of other aqueous species in the solution may influence the removal of Se(IV)

Activated alumina adsorbs selenite at pH levels between 3-8. Aqueous silica adsorbs in preference to selenite at pH 7 but is no problem at pH 4, but selenate adsorption by alumina is poor. Selenate adsorption drops off rapidly with increasing pH and is less than 50% at pH 7. Sulfate and carbonate adsorption significantly interferes with selenate adsorption.

3. Microbiological Processes

These are specific for selenate. The reaction residence time is hours, necessitating retention of large volumes of water or wastewater being treated in bioreactors. Nitrates and sulfates reduce effectiveness of this technique and must be removed or mitigated.

U.S. Pat. No. 4,519,913 describes a microbiological process that reduces the concentration of selenium ions in a waste solution by passing said waste solution through a treatment zone containing a porous matrix on which are retained populations of at least one bacteria of the genus *Clostridium* under anaerobic conditions, said bacteria being capable of metabolically reducing said selenium ions to water insoluble selenium metal. The water insoluble selenium metal resulting from this metabolic reduction is retained on the porous matrix and the resulting aqueous effluent has a lower water soluble selenium ion concentration.

U.S. Pat. No. 4,725,357 describes a method of removing dissolved hexavalent selenium from water by treating the selenium-containing water in a reactor containing microbial biomass and a nutrient for the biomass, substantially in the absence of free oxygen, to cause at least part of the selenium to be captured by particles having a size of 0.1 micron or greater; and passing the discharge from the reactor through a filter in order to filter out particles which captured the selenium. This method is suited for removing dissolved hexavalent selenium from water which contains a higher weight concentration of nitrate than of hexavalent selenium (measured as selenium). In such a process, the concentration of nitrate in the water is lowered to 5 mg/l or below, typically 2 mg/l or less.

In U.S. Pat. No. 5,271,831 a process for removing oxyanions of selenium by selenate respiring microorganisms may be obtained by reducing the nitrate concentration well below 1 mM. In this process, the required lowering of the nitrate concentration in selenium- and nitrate-containing waste water may be accomplished by employing a nitrate utilizing biomass under aerobic conditions in a first treatment zone to remove nitrate followed by a second treatment zone where an anaerobic microbiological reaction using selenate respiring microorganisms to affect the biological reduction of oxyanions of selenium to elemental selenium.

4. Chemical Reduction Processes

These processes reduce selenate to selenite or selenium, and flocculate and co-precipitate the selenium ions or metal for collection and disposal. Ferrous, aluminum and zinc salts are used with ferrous salts being the most common. Iron metal is used sometimes with copper catalyst to reduce selenium ions to selenium metal which precipitates on the iron or as an insoluble iron selenite with ferric hydroxide formed by simultaneous oxidation.

U.S. Pat. No. 4,405,464 describes a method to substantially reduce the concentration of selenium ions in the selenate oxidation state in an aqueous solution by contacting the aqueous solution with metallic iron. The metal iron reduces selenium ions in the Se(VI) oxidation state to at least the Se(IV) oxidation state, and the metallic iron is oxidized and hydrolyzed to form a ferric hydroxide precipitate. The inventors of '464 believe that the selenium is either precipitated on the iron by a cementation process or precipitated on the ferric hydroxide by adsorption of the reduced selenite ions upon the surface of the precipitate to form an insoluble iron selenite.

U.S. Pat. No. 4,806,264 uses ferrous hydroxide at pH's between 8 and 10, preferably at about pH 9. Under these conditions, ferrous hydroxide reduces the selenium ions in an aqueous solution to elemental selenium and is itself oxidized to ferric oxides which are highly magnetic (magnetite and maghemite). The elemental selenium particles remain within the particles of the iron oxides and are collected and removed from the solution by magnetic means.

In U.S. Pat. No. 5,993,667 selenium is removed from selenium-containing water in a two stage process. The water is first cooled to approximately 80 to 90 degrees Fahrenheit and fed to a continuously stirred tank reactor where it is mixed with an aqueous solution of ferric sulfate or other soluble ferric salt to reduce the pH of the water and to produce a precipitate consisting of ferric hydroxide and ferric oxyhydroxide. In a second continuously stirred tank reactor, the treated water is mixed with an aqueous permanganate solution, causing the oxidation of the selenium to selenite and forming a manganese dioxide precipitate. The selenite is adsorbed on both the manganese dioxide and the ferric hydroxide, and is removed with them by centrifugation.

The Selenium Workgroup of The North American Metals Council (http://www.namc.org/selenium.html) has published a report (http://namc.org/docs/00062756.PDF) which extensively reviews the present state of selenium removal technology. They state;

"While the physical, chemical and biological treatment technologies have the potential to remove selenium, there are few technologies that have successfully and/or consistently removed selenium in water to less than 5 µg/L at any scale. There are still fewer technologies that have been demonstrated at full scale to remove selenium to less than 5 µg/L, or have been in full scale operation for sufficient time to determine the long-term feasibility of the selenium removal technology. No single technology has been demonstrated at full scale to cost-effectively remove selenium to 5 µg/L for waters associated with all sectors. Therefore, performance of the technology must be demonstrated on a case specific basis."

The inventors have realized that to economically and efficiently meet selenium removal requirements for the various cases that will arise will require a flexibly designed and integrated process scheme. The inventors describe herein a process that will treat and recycle the input selenium containing water stream, discharging the major part of input selenium containing water as treated water that meets the local requirements for release. Local requirement means the discharge concentration set by one or more local, state or federal governmental agencies, or requirements of downstream processes to which the discharge is sent.

SUMMARY DESCRIPTION

This process scheme described herein will comprise pumping or otherwise sending the selenium containing water to the inlet of a primary reverse osmosis treatment system to produce a primary permeate stream at least meeting the requirements of the location and a concentrate stream containing the removed selenium and other species, a RO concentrate treatment specific to the case which will treat and reduce the selenium content of the concentrate and result in a highly concentrated sludge or other output, and a selenium depleted aqueous overflow stream a portion of which will be combined with the primary permeate stream so the selenium content of the combined stream does not exceed the local requirement, and the remainder of the selenium depleted aqueous overflow stream which will be returned to be combined with the selenium containing water entering the inlet of the primary reverse osmosis treatment.

In an embodiment, the selenium containing water may be pretreated to remove sulfates and/or other sparingly soluble salts before entering the reverse osmosis system to reduce scaling and/or fouling of the RO membranes and to reduce RO retentate processing.

In some embodiments, the selenium in the retentate may be reduced in concentration by contact with metal iron. The iron may be steel wool.

In some embodiments, the selenium in the retentate may be reduced in concentration by anaerobic or anoxic microbiological reduction.

The selenium reduction of the RO retentate may be reduced in conjunction with a sulfate removal process which will produce a product stream having a combinable selenium content and a sulfate concentration that will reduce or eliminate scaling of the RO membranes.

A method by which the minimum ratio of RO permeate flow to amount of treated retentate able to be combined with the permeate and maintain selenium discharge at or below desired concentration is described.

Methods by which scaling materials may be removed from the remainder of treated retentate prior to return to RO inlet is described.

DETAILED DESCRIPTION

Figure 1A:
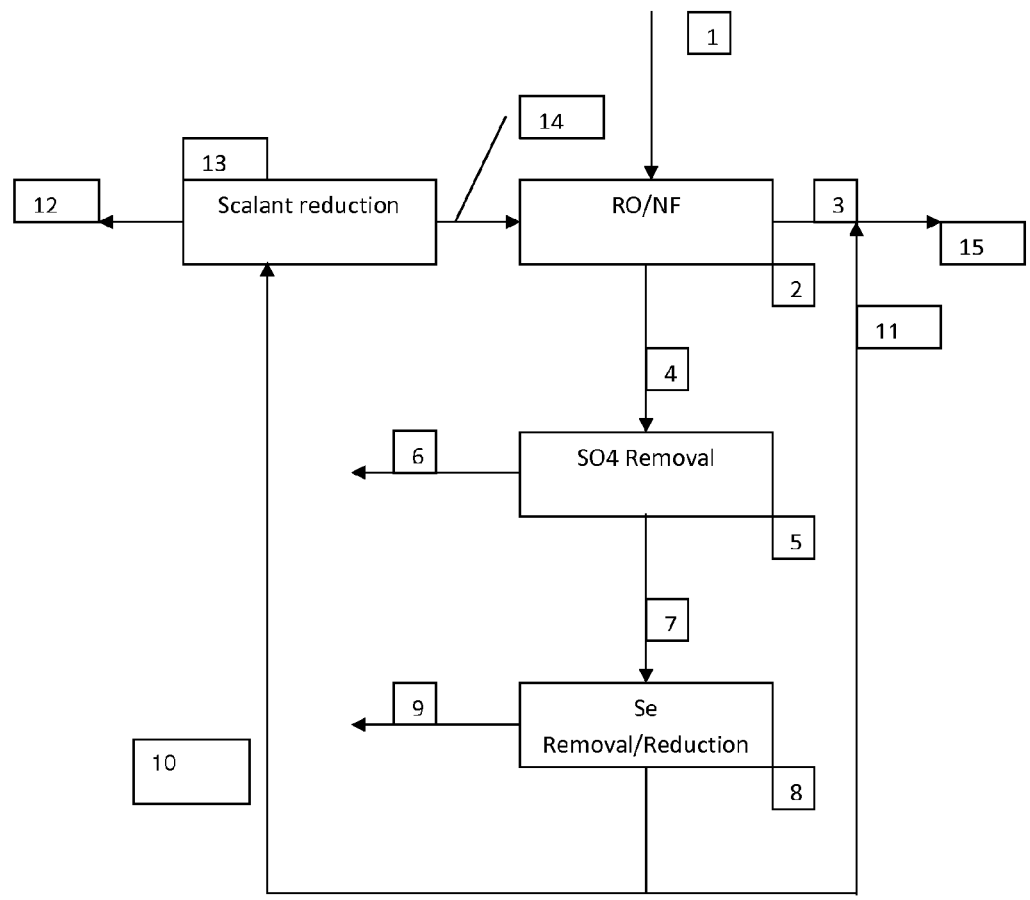
FIG. 1a shows block diagram of an embodiment of the inventive method with a sulfate removal process step in conjunction with a selenium reduction process step.

The varied water sources that would require selenium removal or remediation will require variations of the technology described herein. The inventors describe a flexible integrated process for treating a water source containing selenium ions, for example, but not limited to, selenite or selenate, that will produce a treated effluent stream with less than about 25 µg/L, preferably less than about 10 µg/L, and most preferably less than about 5 µg/L of dissolved selenium, and a semi-solid or sludge stream having primarily chemically reduced selenium metal.

Reverse osmosis filtration is used to purify and/or desalinate water using a semipermeable membrane at elevated pressure. RO or NF membranes are fabricated into modules which separate the high-pressure feed stream from the lower pressure permeate stream. One or more modules are sealed in a container (housing). In operation, a high pressure feed is introduced into the housing and contacts one side or face of the membrane. RO is operated at pressures above the osmotic pressure of the feed, which is determined by the type and concentration of salts in the feed stream. The driving force for permeation through the membrane is related directly to the difference between the feed stream pressure and the osmotic pressure. The larger the difference (Feed minus osmotic) the higher the permeation rate. Purified water, the permeate, passes from the higher pressure side and dissolved entities, such ions, are retained on the high pressure side of the membrane, denoted variously as the concentrate, retentate or reject. The retentate stream exits the housing for further processing or disposal, depending on the use to which the RO/NF system is being applied.

Reverse osmosis membranes can be supplied in a variety of properties. Seawater membranes are used to desalinate seawater (equivalent to approximately 35,000 ppm NaCl) at pressure of 800-1500 psi. This type of membrane will retain over 99% of incident salt. Brackish water membranes operate at lower pressures in waters of lower ionic strength. They will have relatively lower inherent retention of salt ions, but have a higher permeability and when properly engineered, will operate economically. Nanofiltration membranes are so-called "loose" reverse osmosis membranes which retain multivalent ions at greater than about 95% rejection, but pass a larger percentage of monovalent ions through the membrane They have relatively higher permeability than the previously described membranes. For simplicity, reverse osmosis, RO, or RO/NF will be used herein to refer to all the previous mentioned membranes.

Desalination practitioners commonly use once-through flow in reverse osmosis operations, practitioners also use concentrate recirculation, where the concentrate is returned to the feed storage tank. In relatively small applications, such as small scale waste water treatment, where intermittent or non-continuous discharge is used, a batch or semi-batch method is common. A batch operation is one in which the feed is collected and stored in a tank or other reservoir, and periodically treated. In semi-batch mode, the feed tank is refilled with the feed stream during operation.

The RO system may have single or multiple stages. In a single stage system, the feed passed through one or more pressure vessels arranged in parallel. Each pressure vessel will have one or more membrane modules in series. The number of stages in a multiple staged system is defined as the number of single stages the feed passes through before exiting the system. Permeate staged systems use permeate from the first stage as feed for the second stage, and if multiple stages are used, permeate from a stage just prior is used as feed for the following stage. In as reject staged system, the reject stream of a stage is sent to become the feed stream of a subsequent, usually the next, stage. Reject, concentrate and retentate and similar terms have synonymous meanings in RO processing.

RO systems can be engineered in a variety of conformations, depending on the amount of water to be processed, the feed concentrations and the required output. Reverse osmosis system design is the topic of several books, such as The Guidebook to Membrane Desalination Technology: Reverse Osmosis, Nanofiltration and Hybrid Systems Process, Design, Applications and Economics (Wilf, M., et al; Desalination Water to be treated is usually held in a lagoon, pond, storage tank or similar facility. Before entering the treatment process train, a prefiltration step may be used to protect the RO/NF system by removing particles, organic matter, bacteria, and other contaminants. Slow sand filtration may be used. A more preferred method is dual media sand filtration. This method uses a layer of anthracite over a layer of fine sand. Other methods may be used singularly or in combination. These include, but are not limited to, mixed media filtration, non-woven fabric cartridge filtration, and membrane filtration.

Ultrafiltration and microporous membrane filtration, while more expensive, has become more popular because these technologies remove colloidal species more effectively than traditional clarification and filtration methods.

Flocculation, coagulation and precipitation may also be used. However, these methods generate large quantities of sludge. Also, aluminum residuals from alum coagulation may cause colloidal fouling of RO membranes by formation of aluminum silicates. Moreover, polyvalent metal ions, such as used in lime or other precipitation methods, (i.e., iron, aluminum, calcium, magnesium, etc.) can cause silica absorption or complexes and catalyze silica polymerization.

Depending on the feed water source, silica fouling may be a significant problem for RO/NF operation. Silica solubility limits water use in applications such as cooling, boiler, and reverse osmosis (RO), and geothermal applications. Silica concentrations above about 150 to 180 mg/L at ambient temperatures will cause accelerated fouling due to limited silica solubility. At these concentrations, and especially above about 180 mg/L, reactive silica polymerizes to form colloidal silica which will foul membranes and may even plug the feed spacer in membrane modules.

Silica in water is in the reactive or unreactive form. The reactive form refers to monomeric $SiO4$. The polymerized form results when the silica concentration exceeds the saturation limit at the use conditions. Unreactive silica consists of polymerized silica as well as colloidal and granular silica.

Much R&D has gone into silica control technology in aqueous systems. Three approaches are primarily used.
Inhibiting silica polymerization
Increasing the silica solubility as it forms
Dispersion of precipitated silica and silicate compound using polymeric dispersants Magnesium silicate is commonly encountered in RO systems. Magnesium silicate precipitation depends on solution pH and temperature. Above pH 9, magnesium hydroxide and silicate ions are prone to form magnesium silicate. Hydroxide salts such as calcium, strontium, and sodium, may also react with silicate ion, but produce more soluble products and have less fouling potential.

The use of boric acid and/or its water soluble salts to control silica based deposits in cooling water systems operating at 250 to 300 mg/L silica has been reported. However, boric acid is poorly rejected by RO and may lead to problems downstream (effluent discharge limitations on boron).

Solution pH governs silica polymerization. At high silica concentrations, higher pH generates the problem of magnesium silicate scale. Reducing pH simply changes the problem from magnesium silicate to silica.

Chemical methods are also used. Silica inhibitors retard polymerization of monomeric silica. Dispersants place a repelling charge on the silica particle surfaces, which prevent combining and enhance silica particle dispersion in to the water. This subject has been much studied and many chemical and polymer systems have been reported. Examples of polymeric silica dispersants are polyacrylamide-based treatment programs, phosphonate and a copolymer of acrylic acid and 2-acrylamido-2-methylpropane sulfonic acid and hydroxyphosphonoacetic acid and a copolymer of acrylic acid and allyl hydroxy propyl sulfonate. Much of developed products and formulations are proprietary.

Silica is sometimes called the recovery limiting component of a water being desalinated. In RO operation, the high pressure feed stream is imposed on and flows across one side of the membrane and purified water is removed from the other side. The purified flow is the permeate or product stream. The feed side retains the majority of dissolved species, and usually less than 5%, and more usually, less than about 1% of salts and other species pass through the membrane. This causes species concentration in the feed side to increase. The stream being removed is the recovery stream, which is what remains of the feed stream minus the permeate. The recovery stream is not to be confused with process recovery, which will be called permeate recovery herein. The recovery stream carries away the concentrate or rejected species. Permeate recovery, or simply recovery is defined mathematically as the ratio of permeate flow to feed flow, P/F, expressed as a percentage, limits RO operation in two ways. As the concentration in the feed side increases, osmotic pressure increases, which reduces the driving force for permeation. If the solubility limit of a species is reached, precipitation will occur on the membrane surfaces, and the resulting membrane fouling will decrease permeation, reducing productivity, or require an increase in pressure, increasing energy costs.

Permeate recovery for lower salt containing brackish waters typically are in the range of about 70% to 80%. For seawater, with about 35,000 mg/L salt, recovery can be about 35%. Concentrate flow is a major cost factor as it is high pressure waste. Practitioners seek to increase the percentage of permeate flow, i.e., product recovery, and decrease retentate or concentrate flow. Decreasing concentrate flow is limited by silica precipitation due to the increase in solute concentration. Therefore methods for increasing product recovery, or reducing concentrate flow will be beneficial to the desalination industry.

Reference articles such as UltraPure Water, Vol. 16, No. 2, February 1999, Tall Oaks Publishing, 1999, and Desalination, Volume 167, 15 Aug. 2004, Pages 257-272 describe such systems. Commercial chemical systems generally combine inhibitors, dispersants and anti-scalants in various combinations for different waters. Examples are Perma-Treat® PC-510 (Ondeo Nalco, Naperville, Ill. 60563) and Carbosperse™ K-XP212 Copolymer (Lubrizol Corp Wickliffe, Ohio 44092).

Acid mine drainage (AMD), or a similar problem, Acid Rock Drainage, represents a large source of sulfate containing waters. Acid mine drainage (AMD) is low pH water arising from oxidation of iron and other sulfides to sulfuric acid. It is usually considered as water that flows from coal mines or mining waste or tailings, but can occur in metal mining, highway construction and other deep excavations. AMD is a common term sometimes used to refer to any mine operation discharge, many of which are alkaline.

High concentrations of sulfates in water sources present problems to wetlands and their wildlife inhabitants. Sulfates can stimulate microbial sulfate reduction (MSR) wherein sulfate reducing bacteria (SRB) produce sulfide from sulfate in the course of degrading inorganic matter and which controls the methylation and bioaccumulation of neurotoxic methyl mercury (MeHg) in wetlands and swampy areas. MeHg is a potent neurotoxin that bioaccumulates in fish and other wildlife. Other deleterious effects of high levels of sulfates are the generation of hydrogen sulfide and the accelerated release of nitrogen and phosphorous from soils, termed autoeutrophication.

Operators of RO/NF systems, particularly those processing difficult feed waters, such as acid mine drainage, produced water from petroleum drilling operations and waste water remediation face operating problems caused by high levels of multivalent ions such as calcium, magnesium, barium, etc. cations, or sulfate anions. There may be occasions where the operator of a RO/NF process may use a sulfate removal operation to reduce the level of these ions as part of a pretreatment scheme in order to reduce membrane scaling or fouling and simplify the post RO/NF process.

The traditional treatment of AMD is with lime and limestone to neutralize acidity and precipitate out calcium sulfate (gypsum). However, relatively high levels of sulfate remain. Depending on composition and ionic strength, sulfate concentrations of about 1500 mg/l to up to 4000 mg/l, may remain after such treatments. Calcium content is also high due to the lime treatment, and there are other metal ions present as well.

Figure 2:
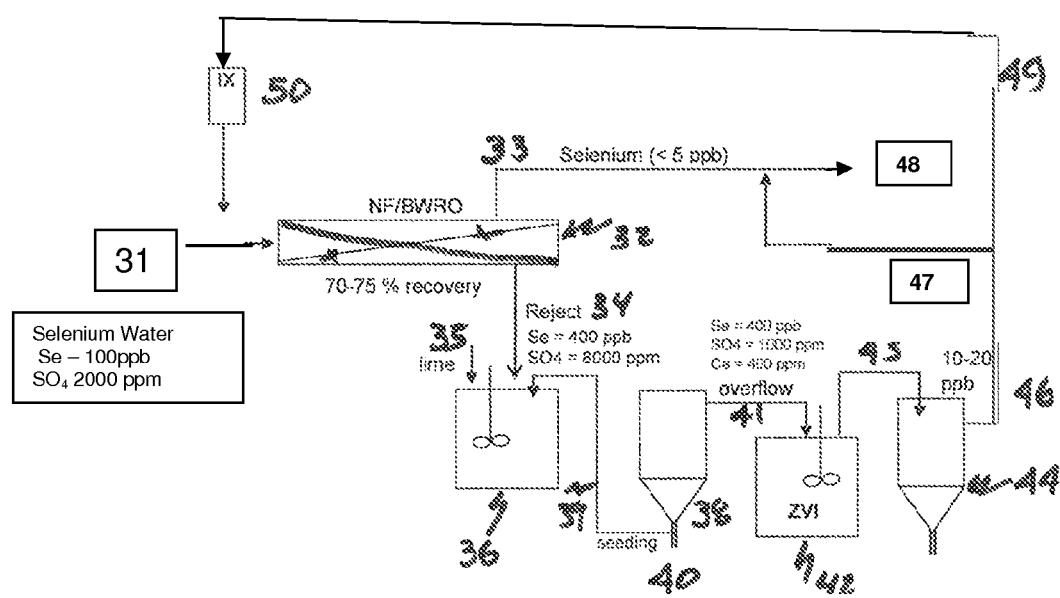
FIG. 2 illustrates a process design for selenium removal with retentate recycle.

US published patent application 20110132839 describes a process for reducing sulfate levels of a water source. The preferred process comprises a novel combination of ion exchange, reverse osmosis (RO) and precipitation to treat of high sulfate bearing streams. FIG. 2 shows an outline of the preferred process steps. In this process calcium is removed from the feed stream by SAC (strong acid cation) ion exchange resin and exchanged for the counterion of the SAC. A preferred counterion is sodium. The SAC step is followed by sulfate concentration using preferably a membrane separation process, more preferably, a reverse osmosis (RO) process. A descriptor of concentration is the ratio defined as the sulfate concentration going to the sulfate precipitation process step (described below) divided by the sulfate concentration of the stream leaving the SAC step. RO concentrate containing $Na_2SO_4$ is then mixed with spent regenerant ($CaCl_2$) to precipitate out gypsum ($CaSO_4$). A process step comprising carbonate precipitation in which sodium carbonate is added to the overflow stream of the gypsum precipitation step produces further reduction of calcium concentration. The effluent from carbonate precipitation is concentrated with an RO system producing a NaCl brine solution which is employed for regenerating the SAC ion exchange beds. The advantage of this process is that the use of chemicals is minimized by treating, reconcentrating and recycling regenerant after mixing with RO concentrate. The process also minimizes capital expenditure by precipitation of only side stream flows. An important attribute of the overall process is that each step contributes to improving the effectiveness of a subsequent step.

US published patent application 20110163032 describes a process for RO desalination for water sources that are high in silica concentration. The water feed is first filtered with a particle removing filter, preferably a microporous (MF) or ultrafiltration (UF) membrane filter, more preferably, a backwashable microfiltration or ultrafiltration membrane filter to remove suspended solids that could otherwise foul the RO membranes. A silica dispersant is introduced prior to the RO step and the water recovery in the RO is controlled to the percent recovery point where the silica concentration in the RO reject does not exceed the dispersant manufacturer's recommendation.

Some or all of the primary RO concentrate is preferably filtered by a microporous or ultrafiltration membrane, more preferably, a backwashable microfiltration or ultrafiltration membrane filter and the filtrate is further treated with RO. This microporous or ultrafiltration membrane can be either the same as used for pretreatment ahead of the RO or a separate MF or UF dedicated to only receive RO concentrate as its feed. In the former case, the feed to the MF will be a blend of recycled RO concentrate and feed water. In the latter case, the MF or UF filtrate can be either introduced to the feed of the primary RO, or alternatively introduced to a separate or secondary RO for further treatment and salt concentration.

Backwashing physically removes solids accumulated in a membrane module during filtration. Gas, usually air (gas backwash) or pumped filtrate (liquid backwash) is forced through the membrane filter from the permeate side to the feed side. Backwashing is done periodically or as needed to maintain permeation rate, either automated or manually.

The technique could potentially be applied to remove other dispersed species or dispersed colloidal solids from RO concentrate such as but not limited to calcium fluoride, sulfate, phosphate, etc. where the dispersed colloidal particles are filterable with MF or UF, either alone or in conjunction with a coagulant chemical added to the feed prior to the MF or UF. The technique could be extended to other concentration processes where chemicals must be used to prevent precipitation of silica and salts that exceed their solubility limit in the concentrate. Examples include evaporators and cooling towers.

The method removes silica by a combination of a chemical dispersant and a membrane filter to remove dispersed silica. Other colloidal and particulate entities will also be removed concurrently. Concentrate recovery plays an important role in this process, so it is important that the silica be brought to a state which will allow removal from the stream.

Operators of embodiments of the invention described herein, particularly those processing difficult feed waters, such as acid mine drainage, produced water from petroleum drilling operations and waste water remediation may face operating problems caused by high levels of multivalent ions such as calcium, magnesium, barium, etc. cations, or sulfate anions. There may be occasions where the operator of these embodiments may use a sulfate removal operation to reduce the level of these ions as part of a pretreatment scheme to reduce scaling or fouling and simplify the post RO/NF process.

Figure 1B:
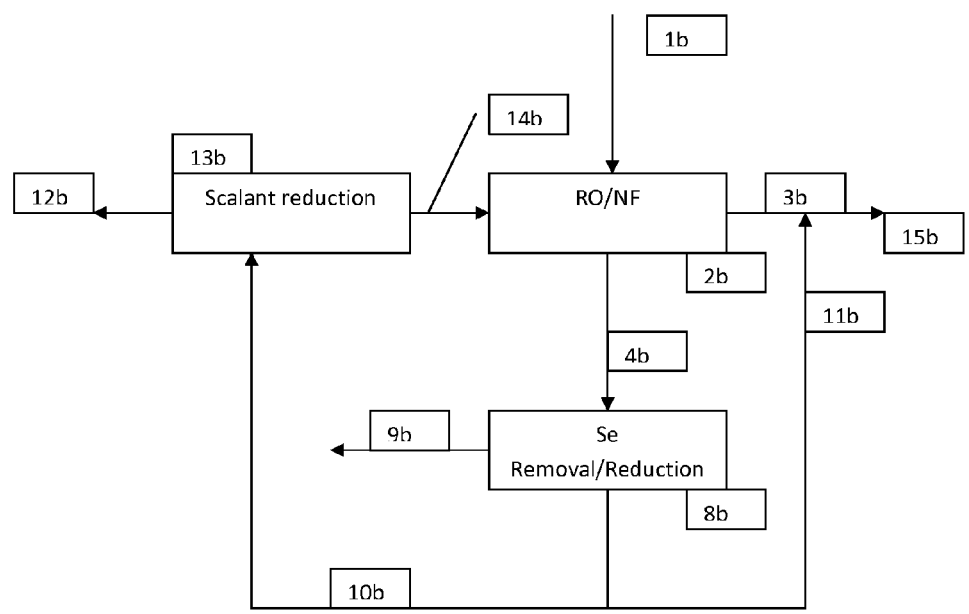
FIG. 1b shows block diagram of an embodiment of the inventive method with a selenium reduction process step.

FIGS. 1a and 1b are block diagrams illustrating the basic process. In FIG. 1a, a pretreated water stream (1) is fed to a reverse osmosis or nanofiltration system (2), designated RO/NF for convenience, to separate the stream into a purified water product effluent stream having a reduced selenium content (3) and a concentrate or retentate stream (4) containing the removed species, including selenium salts. Stream (4) then enters a sulfate removal step (5). In this step sulfate is separated from the water stream. Practitioners skilled in liquid-solid separations will be able to choose one or more methods based on engineering, regulatory agency's requirements and costs. Without being limited by the following, examples of such processes are; precipitation of sulfate by lime to form gypsum, or by removal by strong acid cation ion exchange. Stream (6) in FIG. 1a is the solid or sludge precipitate of sulfate and other salts that may be entrained, by for example, a lime precipitation process step. Stream (7) is the overflow stream, depleted of sulfate, which is fed to the selenium reduction step. The type and scope of the sulfate removal process step depends on the concentration of sulfate and other salts in the membrane system retentate stream and how the retentate stream will affect downstream steps.

The selenium reduction step (8) is used to chemically reduce oxyanions of selenium to elemental selenium and selenium ions precipitated or co-precipitated by the process which can be recovered. A method that uses selenate respiring microorganisms under anaerobic conditions to produce elemental selenium is described in U.S. Pat. No. 5,271,831, incorporated by reference. U.S. Pat. No. 4,405,464, incorporated by reference, discloses treating aqueous selenate with iron under pH conditions favoring iron hydroxide and elemental selenium formation. Without being limited to these processes, these examples show processes to remove oxyanions of selenium from a water stream which may be used in the integrated process described herein.

The selenium removal step (8) of FIG. 1a separates the inlet stream into a selenium containing sludge in the case of the biological process or a ferrous sludge in the case of the iron process and an overflow stream containing reduced selenium content. A portion (11) of the overflow is blended with the effluent stream of the RO/NF process step in a controlled manner so that the combined stream (15) does not contain selenium above the desired concentration. The remainder of overflow from process step (8), stream (10) is optionally sent to a scalant reduction process (13) for treatment of sparingly soluble ions or excess calcium or other multivalent ions. Step (13) will be required in situations where the concentration of dissolved species in the overflow from step (8) may precipitate or otherwise foul the membranes of the RO/NF system. The output stream from step (13), stream (14), is combined with the feed stream (1). Stream 12 is, for example, the brine regeneration if an ion exchange process is used for scalant reduction process (13).

FIG. 1b shows the basic process without a sulfate removal step. This process will be used in situations where sulfate concentrations are low, or where the pretreatment of the water source includes a sulfate removal step or process. In FIG. 1b, a pretreated water stream (1b) is fed to a reverse osmosis or nanofiltration system (2b), designated RO/NF for convenience, to separate the stream into a purified water product effluent stream (3b) having a reduced selenium content and a concentrate or retentate stream (4b) containing the removed species, including selenium salts. The selenium removal step (8b) of FIG. 1b separates the inlet stream into a selenium containing sludge in the case of the biological process or a ferrous sludge in the case of the iron process and an overflow stream containing reduced selenium content. A portion (11b) of the overflow is blended with the effluent stream of the RO/NF process step in a controlled manner so that the combined stream (15b) does not contain selenium above the desired concentration. The remainder of overflow from process step (8b), stream (10b) is optionally sent to a scalant reduction process (13b) for treatment of sparingly soluble ions or excess calcium or other multivalent ions. Step 13b will be required in situations where the concentration of dissolved species in the overflow from step (8b) may precipitate or otherwise foul the membranes of the RO/NF system. The output stream from step (13b), stream (14b), is combined with the feed stream (1b)

DESIGN AND EXPERIMENTAL

An illustrative process flow diagram of the proposed integrated process is schematically shown in FIG. 2. This diagram is not meant to limit the invention to this embodiment, but is meant to illustrate the basic steps of the process so that a skilled practitioner may adapt the process, further relying on the description in this specification, to any specific case. The feed (influent) water (31) is first introduced to the NF or RO system (32). The selenium rejection by these membranes are more than 95% and therefore the permeate quality will be qualified for direct discharge. The reject/concentrate stream will have high concentration of sulfate. A common method to reduce sulfate content is by chemical precipitation by lime addition. The overflow from the sulfate clarifier is sent to a step where selenium is chemically reduced and precipitated. The clarifier effluent of the Se reduction will have less than 1000 ppm of sulfate and 10-20 ppb of selenium. The effluent can partially be blended with the permeate stream and remaining effluent may be sent back to feed influent. The overall recovery through this process will be >95%.

An IX step (48) is shown as a method to remove residual calcium in order to minimize the calcium sulfate scaling of the RO or NF membranes. Alternatively an antiscalant may be added into the RO feed to suppress $CaSO_4$ scaling.

In operation, the feed (influent) water (31) is first introduced to the NF or RO system (32). For the purposes of this discussion, the flow rate is 5 gallons per minute (gpm), containing 100 ppb selenium as selenate and/or selenite and 2000 ppm sulfate ($SO_4^=$). The feed water is separated by the membrane system into a permeate stream (33) with a flow rate of 3.75 gpm reduced selenium content, here under 5 ppb selenium and a concentrate stream (34) at 1.25 gpm containing 400 ppb selenium and 8000 ppm sulfate.

The concentrate is sent to a stirred tank reactor (36) where it is combined with lime (35) and sent through line (37) to clarifier (38) in which sulfate precipitate settles to the bottom and is removed as a sludge stream (40) and clarified water, reduced in sulfate, is sent by line (41) to a selenium reduction step, here indicated as a iron or ZVI (zero valence iron) chemical reduction of selenium and ferrous/ferric precipitation process step. A portion of the sulfate sludge stream (39) may be returned to stirred tank (36) to act as seed for initiating precipitation.

As a result of the iron/selenium reaction, selenium is removed as a iron/selenium metal and/or a ferrous/ferric hydroxide/selenium (usually selenite) precipitate. The clarifier (44) splits the output into a iron sludge (45) and a clarified water stream (46). This stream is further split into a stream which is combined with the RO permeate (47) to form the total effluent flow (48), (see below) and the remainder (49) is returned to the influent (31). Depending on multivalent ion content, particularly calcium ions, a ion exchange (50), preferably a strong acid cation exchange will optionally be used to prevent scale formation on the membrane surface. Alternatively an antiscalant may be added into the RO feed to suppress $CaSO_4$ scaling.

The practitioner will control stream (47) depending on the flow rate and selenium content of the RO permeate and the selenium content of clarifier overflow stream (46).

In order to be able to combine a portion of stream (46) with permeate stream (33) one or both streams have to have Se content lower than the design effluent content. The design effluent content may be set to meet regulatory agencies mandates or for other process needs.

As an illustration, sample calculations in Table 1 below show how a practitioner of this technology would control flow (47) to maintain the selenium content of the total effluent below 5 ppb Se when the permeate stream content is below the design effluent content.

Table 1 shows how overflow rate portion (47) and concentration affect final effluent concentration.

This is calculated from the equation; RO permeate flow X Permeate concentration+overflow rate X overflow concentration divided by the total effluent flow, that is, permeate plus overflow. Or;

$$(Jp \cdot Cp + Jo \cdot Co)/Jp + Jo = Q \qquad \text{Equation 1}$$

where;
Jp=permeate stream flow rate
Jo=clarifier overflow portion combined with Jp
Cp=permeate Se content
Co=clarifier overflow portion Se content
Q=maximum design or regulated effluent Se content It is apparent that the RO permeate has to be below the desired Se concentration in the case where the overflow from the Se clarifier will have a higher Se concentration than required by local specifications. By changing the overflow amount (stream 47) sent to be combined, the total effluent Se content can be controlled to below the required effluent Se concentration, here assumed as 5 ppb.

Equation 1 may be rearranged to calculate the maximum Jo for any Jp.

$$Jp/Jo = (Q-Co)/(Cp-Q) \qquad \text{Equation 2}$$

If the Se clarifier overflow stream (46) is lower than the permeate stream, and the permeate stream is above design content, then in a similar manner, a portion of the permeate stream will be combined with stream (46) and the remainder will be returned to the feed inlet.

The design implications of the relation between the content of the two flows is shown in Table 1 below.

TABLE 1

| Permeate Se content | Overflow Se content | Design Implication |
|---|---|---|
| Cp < Q | Co < Q | May combine up to 100% |
| Cp < Q | Co > Q | Use Eq 2 to calculate flow ratio and amount of Jo that can be added to Jp |
| Cp > Q | Co > Q | Process does not meet design |
| Cp > Q | Co < Q | Use Eq 2 to calculate flow ratio and amount of Jp that can be added to Jo and return uncombined permeate to feed inlet |

In the calculated results of Table 2 below, the flow rates of the RO permeate stream and the portion of the clarifier overflow stream that are illustrated in FIG. 2 are used to show the relative flow rates that may be used to obtain a total process effluent meeting the design and/or regulatory requirements for maximum selenium discharge, here designated Q. Two levels of Cp, permeate selenium concentration, and two levels of Co, the selenium concentration in the selenium removal clarifier overflow are used with several values of Jo. Jo is the flow rate of the portion of the selenium removal clarifier overflow combined with the permeate flow to make up the total process effluent. In the calculations Q=5 ppb. Co is greater than Q in these calculations.

The user of this process will be able to determine, by this type of calculation, flow rates for Jo that will allow a total effluent content less than Q.

The benefits of being able to combine a portion of the selenium removal clarifier overflow with the RO permeate stream and also control the total process effluent selenium content to below Q lie in the fact that the user does not have to have a process that reduces the concentrated selenium of the retentate stream to below the Q value. This will allow the user to adapt more easily to changes or variations in retentate concentrations. Furthermore, by recycling the clarifier overflow, in essence the RO retentate, the size and residence time of the downstream sulfate removal, if used, and the selenium removal processes may be reduced since a high level of Se removal to attain a effluent equal or lower than Q from these steps is not needed. This ability will reduce capital and operating costs.

TABLE 2

Effect of Jo on Effluent Se Concentration

| RO perm flow | RO perm SE (ppb) | Overflow | Overflow conc | Effluent (ppb) |
| --- | --- | --- | --- | --- |
| 3.75 | 3 | 2 | 10 | 5.43 |
| 3.75 | 3 | 1 | 10 | 4.47 |
| 3.75 | 3 | 0.5 | 10 | 3.82 |
| 3.75 | 4 | 2 | 10 | 6.09 |
| 3.75 | 4 | 1 | 10 | 5.26 |
| 3.75 | 4 | 0.5 | 10 | 4.71 |
| 3.75 | 4 | 0.1 | 10 | 4.16 |
| 3.75 | 3 | 2 | 20 | 8.91 |
| 3.75 | 3 | 1 | 20 | 6.58 |
| 3.75 | 3 | 0.5 | 20 | 5.00 |
| 3.75 | 4 | 2 | 20 | 9.57 |
| 3.75 | 4 | 1 | 20 | 7.37 |
| 3.75 | 4 | 0.5 | 20 | 5.88 |
| 3.75 | 4 | 0.1 | 20 | 4.42 |

Practitioners of the technology described herein will be able to take advantage of being able to combine a portion of the clarifier overflow with the permeate or combine a portion of the permeate with the clarifier overflow depending on the effectiveness of the RO of NF system and the effectiveness of the selenium removal process in the particular situation faced.

If it is desired to have a low permeate content, the practitioner may choose to use a multistage permeate staged Ro or NF process. In this type of process the permeate the first stage is fed to the inlet of the second stage, and if needed, the permeate from that stage is fed to a third stage, etc. The concentrate from the second and subsequent stages is purer than the inlet feed and may be returned to the incoming feed inlet to improve process system recovery.

RO or NF system recovery is defined as the permeate flow divided by the feed flow.

Permeate staged RO process will result in lower Se content final permeate since the stream is membrane treated more than once.

A practitioner may desire to reduce the volumetric load on the downstream processes. The practitioner then may choose to increase system recovery by an RO or NF concentrate recovery process. In one version of this type of process, the concentrate stream is fed to a subsequent stage for RO or NF treatment, thereby reducing the final concentrate volume to be sent to sulfate and selenium removal process steps.

In other cases, usually for smaller operations, the practitioner may use a batch RO or NF process, where a feed tank or similar holds the feed volume and is processed with RO or NF concentrate return to the tank until tank concentration becomes high enough so that RO or NF rejection declines to a level that does not allow meeting design effluent Se content. The concentrated tank contents would be periodically emptied and treated for sulfate removal, if required and selenium removal. The practitioner would have the choice of designing the overall process to have some or all of the permeate held in a tank or pond, etc., to be combined with some or all of the selenium clarifier overflow stream to make up the final effluent.

Rather than a batch process, a semi-batch or fed tank process may be used. In the processes, the concentrate is returned to the feed tank and feed is added to make up for permeate or a portion of the permeate removed. Further processing options are as described for a batch operation.

Example 1

A test was conducted to determine the properties of a reverse osmosis process on a synthetic selenium containing feed. A single stage low pressure RO system consisting of three single module housing was evaluated with a feed solution of selenate (Se(VI) in 1% $Na_2SO_4$ solution of pH 8-8.5, with 5 ppm of antiscalant (Flocon 135; Applied Membranes Vista Calif.) was added to avoid membrane scaling. Feed pressure was 210-220 psig (1.45-1.51 MPa), permeate/concentrate ~0.8/~0.4 gpm (~3.03/~1.51 liter/min), recovery ~65-67%, selenium rejection 90-95%.

Two sequential tests were run with fresh feeds.

Figure 3:
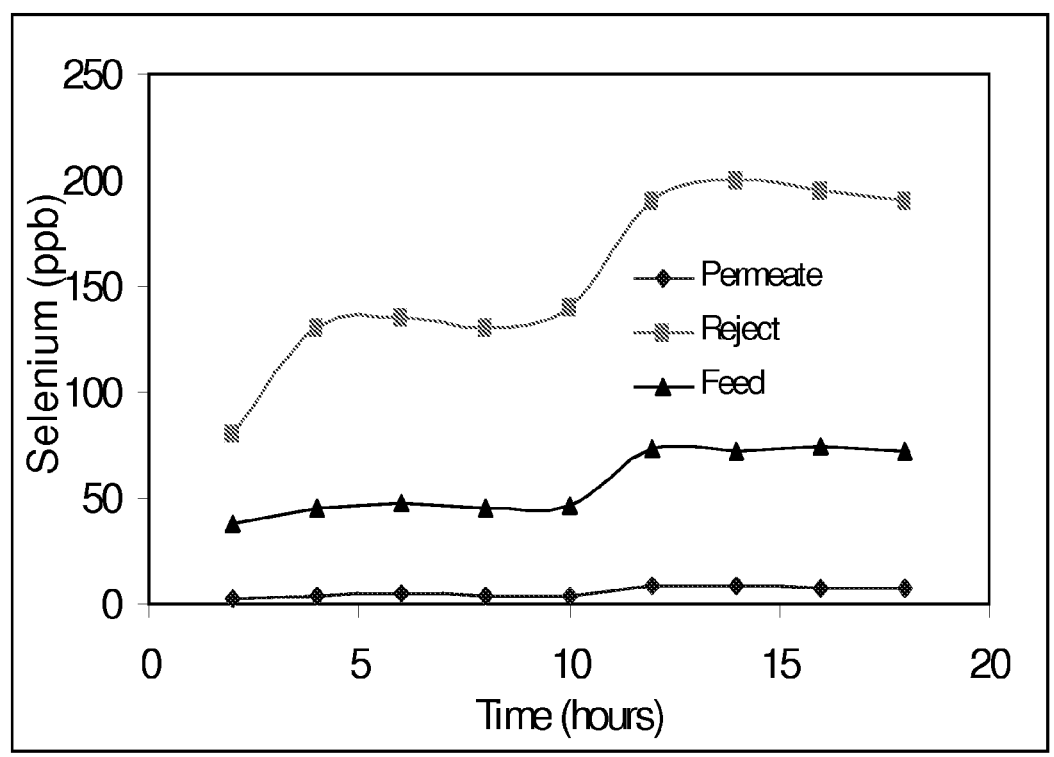
FIG. 3 shows results from a reverse osmosis trial with a selenium containing water source.

FIG. 3 shows the selenium content of the feed, concentrate, and permeate for this example. The second days run (starting at 10 hours) had a slightly high feed concentration which resulted in somewhat higher permeate content, and higher concentrate content.

For a feed of ~50 ppb, this rejection is satisfactory for attaining less than 5 ppb effluent.

For feed waters having higher selenium content, the user may use a permeate staged RO system to arrive at the desired permeate concentration Example 2

Figure 4:
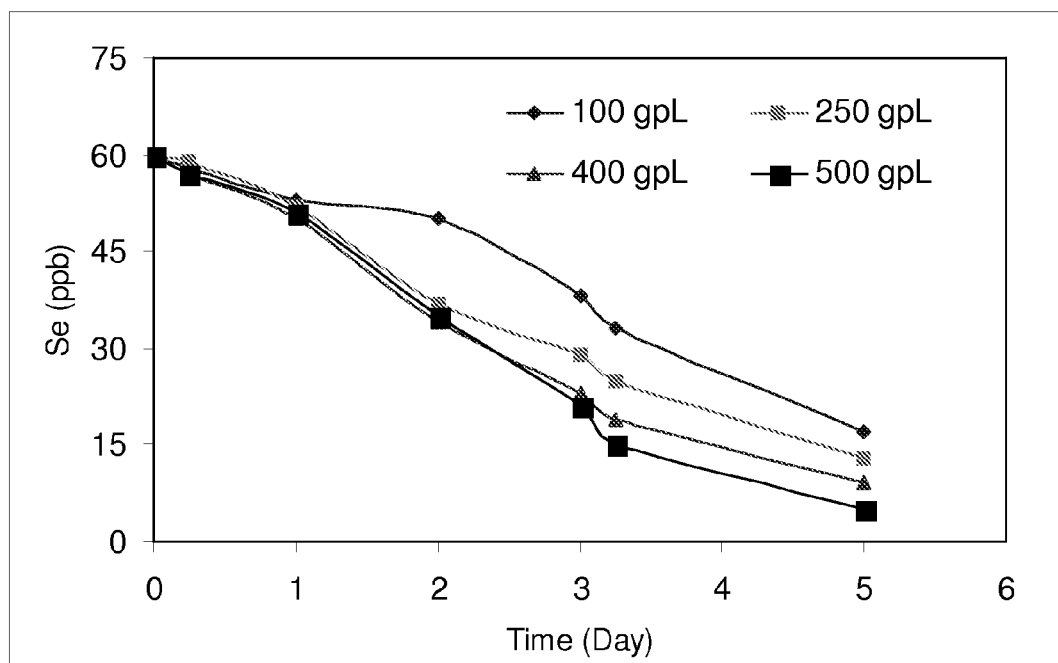
FIG. 4 shows the effect of several loadings of iron filings on selenium reduction.
Figure 5A:
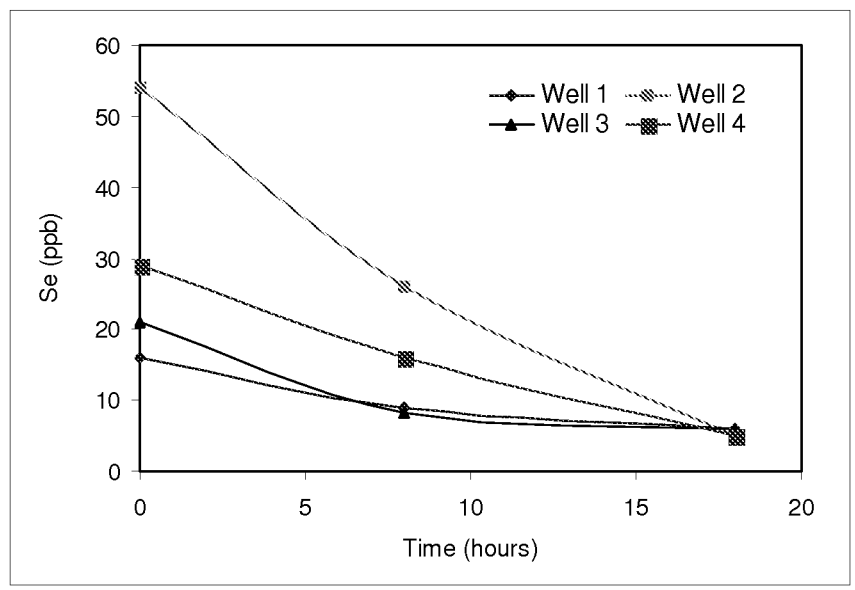
FIG. 5a shows the effect of using steel wool for selenium reduction in a waste water source.
Figure 5B:
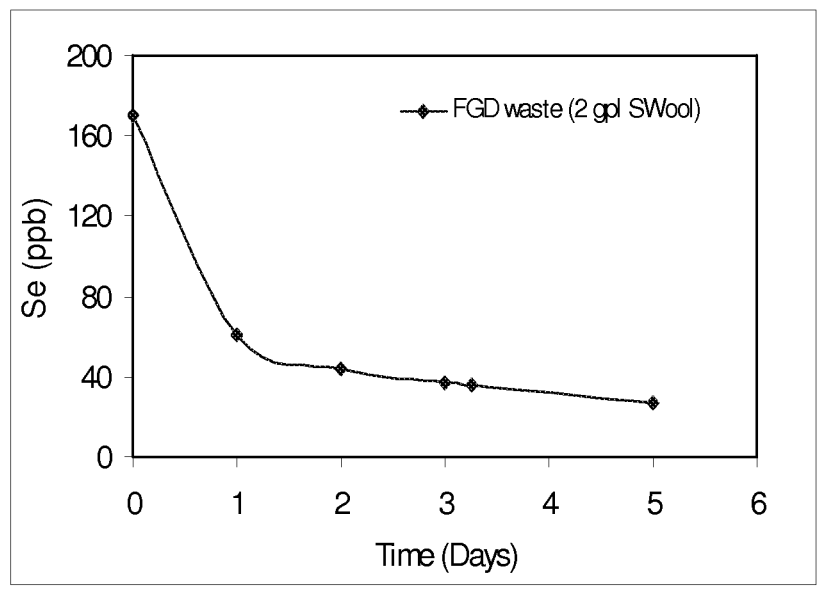
FIG. 5b shows the effect of using steel wool for selenium reduction in a waste water source.

FIG. 4 shows the results of a test to determine the effectiveness of using iron filings of approximately 2-5 mm size to remove selenium from water. Iron used for this purpose is sometimes called Zero Valent Iron, ZVI. Four 500 ml test solutions of 1% sodium sulfate solution containing 60 ppb of selenate (SeVI) were stirred with 100 g/L 9 gram per liter), 250 g/L, 400 g/L and 500 g/L iron filings respectively. FIG. 5b shows the decrease in dissolved selenium content over a period of days. Higher dosages show a lower selenate reduction, more so after day 3.

Example 3

Two industrial waste samples were tested for selenate removal using 2 grams per liter steel wool as the reducing agent. Steel wool is a bundle of strands of very fine soft steel filaments, made from low-carbon steel, used to polish wood or metal objects, and for cleaning household cookware. FIG. 5a shows that 4 samples of initial concentration from approximately 15 ppb to approximately 55 ppb were reduced to the 5 ppb in 5 hours. The results of FIG. 5b show a rapid drop in dissolved selenate level in the first day and then a slower reduction in selenate level over the next 4 days. The final concentration was about 37 ppb from an initial level of 170 ppb.

The results of the experiments shown in FIGS. 4, 5a and 5b show that the type of water source being treated and iron type and size effect selenate reduction.

Example 4

To take advantage of the apparent high initial reaction rate of selenate removal by ZVI, a test was run using three sequential reactors. The reactors were 500 ml volume containing 20 grams of steel wool. Both PP and FGD waste were evaluated. Tests were run with 30 (Test1) and 60 minutes (Test2) agitation. The results in Table 3 show that the longer agitation time gave improved Se reduction.

TABLE 3

Selenium Removal by Three Sequential Reactors using 40 g/L Steel Wool as ZVI Source

| Test #1 | PP Stream 54 ppb Initial Se Content 30 minute residence per tank | FGD Waste Stream 160 ppb Initial Se Content 30 minute residence per tank |
|---|---|---|
| Cycle 1 Se content exit tank 1 | 41.8 | 118.9 |
| Cycle 1 Se content exit tank 2 | 31.6 | 89.1 |
| Cycle 1 Se content exit tank 3 | 13.8 | 56.6 |
| Cycle 2 Se content exit tank 1 | 32.3 | 118.9 |
| Cycle 2 Se content exit tank 2 | 24.9 | 76.4 |
| Cycle 2 Se content exit tank 3 | 15.4 | 46.7 |
| Cycle 3 Se content exit tank 1 | 29.9 | 76.4 |
| Cycle 3 Se content exit tank 2 | 22.1 | 52.3 |
| Cycle 3 Se content exit tank 3 | 15.0 | 49.5 |
| Average Effluent Se after 3 tank treatment | 15 ppb | 45 ppb |

| Test #2 | PP Waste Stream 32 ppb Initial Se Content 60 minute residence per tank | FGD Waste Stream 60 ppb Initial Se Content 60 minute residence per tank |
|---|---|---|
| Cycle 1 Se content exit tank 1 | 29.0 | 50.1 |
| Cycle 1 Se content exit tank 2 | 15.6 | 37.7 |
| Cycle 1 Se content exit tank 3 | 9.8 | 22.3 |
| Cycle 2 Se content exit tank 1 | 29.7 | 55.1 |
| Cycle 2 Se content exit tank 2 | 13.6 | 38.2 |
| Cycle 2 Se content exit tank 3 | 6.8 | 24.3 |
| Average Effluent Se after 3 tank treatment | 7 ppb | 27 ppb |

Experiment 5

Nano ZVI Slurry

A slurry was prepared from 20 grams of FeSO4.7H2O, 40 ml water and 1 ml of NaBH4.

The resultant black slurry of nanosized iron was used as a selenium reducing agent. Table 4 shows the result of a test where 500 m samples of PP or FGD waste were treated or shaken for 14 hours with 2 or 5 ml of the slurry added. The data indicate effectiveness of this form of ZVI.

TABLE 4

| 500 ml Sample + ZVI slurry | Initial Se ppb | Se ppb after 3 hr | Se ppb after 14 hr |
|---|---|---|---|
| PP - ZVI 2 ml | 54 | 47 | 44 |
| PP - ZVI 5 ml | 54 | 30 | 28 |
| FGD - ZVI 2 ml | 170 | 94 | 92 |
| FGD - ZVI 5 ml | 170 | 83 | 81 |

The invention claimed is:

1. An integrated process for removing selenium from a water source containing selenium, the process comprising: filtering a first water feed stream including water from the water source with a membrane filtration process to produce a first water product stream having a reduced selenium content and a first retentate;
separating sulfate from the first retentate to produce a stream including removed sulfate and an overflow stream depleted in sulfate;
treating the overflow stream to produce a second water product stream having a selenium content less than a selenium content of the first retentate, and a concentrate by metabolically reducing selenium ions in the overflow stream with bacteria under anaerobic conditions;
combining a first portion of the second water product stream with the first water product stream to produce a process effluent having a selenium content less than or equal to a predefined maximal selenium content; and
combining a remaining portion of the second water product stream with the water from the water source to generate the first water feed stream.

2. The process of claim 1, wherein the membrane filtration process is a reverse osmosis process.

3. The process of claim 1, wherein the membrane filtration process is a nanofiltration process.

4. The process of claim 1, wherein treating the overflow stream further includes chemically reducing selenium in the overflow stream by contacting the overflow stream with iron.

5. The process of claim 4, wherein the iron is steel wool.

6. The process of claim 1, wherein the minimum ratio of Jp to Jo of the second product stream being combined with the first product stream is defined by the equation $$Jp/Jo=(Q-Co)/(Cp-Q)$$

where;
Jp=first water product stream flow rate
Jo=second water product steam portion combining with Jp
Cp=Se content of the first water product stream
Co=second water product steam portion Se content
Q=maximum design or regulated effluent Se content
under the conditions that;

$$Cp<Q \text{ and } Co>Q.$$

7. The process of claim 1, wherein the minimum ratio of Jo to Jp of the second product stream being combined with the first product stream is defined by the equation $$Jo/Jp=(Q-Cp)/(Co-Q)$$

where;
Jp=first water product stream flow rate
Jo=second water product steam portion combining with Jp
Cp=Se content of the first water product stream
Co=second water product steam portion Se content
Q=maximum design or regulated effluent Se content
under the conditions that;

$$Co<Q \text{ and } Cp>Q.$$

8. The process of claim 1, further comprising adding one or more anti-scalant chemicals to the remaining portion of the second water product stream.

9. The process of claim 1, further comprising pretreating the water source with a sulfate removal process.

10. The process of claim 1, wherein separating sulfate from the first retentate includes precipitating sulfate from the first retentate by the addition of lime to the first retentate.

11. The process of claim 10, wherein the lime is added to the first retentate in a reactor, and the process further comprises precipitating sulfate in a clarifier downstream of the reactor and returning a portion of the precipitated sulfate to the reactor to act as a seed for initiating precipitation of the sulfate.

12. The process of claim 1, wherein separating sulfate from the first retentate includes removing sulfate from the first retentate by strong acid cation exchange.

13. The method of claim 1, further comprising treating the remaining portion of the second water product stream with an ion exchange resin prior to combining the remaining portion of the second water product stream with the water from the water source.

14. The process of claim 13, wherein treating the remaining portion of the second water product stream with the ion exchange resin includes passing the remaining portion of the second water product stream through a strong acid ion exchange resin.

15. The method of claim 13, further comprising regenerating the ion exchange resin with brine.

16. The method of claim 1, wherein the predefined maximal selenium content is 5 µg/L.

17. The method of claim 1, wherein filtering the first water feed stream with the membrane filtration process to produce the first water product stream includes removing more than 95% of the selenium from the first water feed stream.

18. The method of claim 1, comprising recovering greater than 95% of the water from the water source.

19. An integrated process for removing selenium from a water source containing selenium, the process comprising:
 filtering a first water feed stream including water from the water source with a membrane filtration process to produce a first water product stream having a reduced selenium content and a first retentate;
 separating sulfate from the first retentate to produce a stream including removed sulfate and an overflow stream depleted in sulfate;
 treating the overflow stream to produce a second water product stream having a selenium content less than a selenium content of the first retentate, and a concentrate by one of metabolically reducing selenium ions in the overflow stream with bacteria under anaerobic conditions or chemically reducing selenium in the overflow stream by contacting the overflow stream with iron;
 combining a first portion of the second water product stream with the first water product stream to produce a process effluent having a selenium content less than or equal to a predefined maximal selenium content; and
 combining a remaining portion of the second water product stream with the water from the water source to generate the first water feed stream.

* * * * *